July 12, 1960 E. H. LAND 2,944,894
PHOTOGRAPHIC PROCESSES UTILIZING SCREEN MEMBERS
Filed Sept. 28, 1955

INVENTOR
Edwin H. Land

BY Brown and Mikulka
and
Moncure B. Berg
ATTORNEYS

United States Patent Office 2,944,894
Patented July 12, 1960

2,944,894

PHOTOGRAPHIC PROCESSES UTILIZING SCREEN MEMBERS

Edwin H. Land, Cambridge, Mass., assignor to Polaroid Corporation, Cambridge, Mass., a corporation of Delaware Filed Sept. 28, 1955, Ser. No. 537,261

15 Claims. (Cl. 96—3)

This invention relates to photographic processes especially useful in carrying out practices wherein a layer of a photosensitive material is exposed through a screen member, i.e., a lenticular screen or an additive color screen, and an image provided or formed in an individual layer, which is adapted to be carried by said screen, is viewed or projected for viewing by means of light directed through the same screen member.

This invention is a continuation in part of my copending application Serial No. 265,413, filed January 8, 1952, now Patent No. 2,726,154, granted December 6, 1955.

Objects of the invention are to provide processes for forming photographs by the employment of a screen of the character having an array of minute optical elements through which a photosensitive layer carried by the screen is exposed by light directed through the screen to form a plurality of latent images, following which a processing liquid is permeated into the photosensitive layer and exposed portions thereof are acted upon by said processing liquid to form visible records of said images in a layer of image-receptive material adapted to be carried by said screen on the side thereof through which light for exposing the photosensitive layer is emitted after passing through the screen, and wherein said visible records are retained in permanent relation to the screen; as well as to provide photographic processes carried out with the products hereinafter described for forming a reversal type of image which possesses a density of an order of 5 or 6 times greater than that possessed by a silver image developed in a photosensitive silver halide layer whereby the high covering power of the silver of the reversal image may be utilized to permit continued maintenance of a multi-layered type structure for viewing or for projection purposes.

Additional objects of the invention are to provide photographic processes which involve the development of latent images in a layer of a photosensitive silver salt by light directed through a light-entering face of a transparent screen to provide a plurality of developable latent images in said photosensitive layer, and wherein a solvent for the silver salt is reacted with part at least of the undeveloped silver salt to form in the photosensitive layer a differential distribution of diffusible silver complex and this complex is utilized to form a visible record of each latent image by reducing to silver the silver ions of the complex in the presence of a silver precipitating agent contained in a layer which is carried by said screen on the light emission side thereof and in which there is present at least a part of said differential distribution of said silver complex, said last-mentioned layer being retained together with said screen as a unit.

Other objects of the invention will in part be obvious and will in part appear hereinafter.

The invention accordingly comprises the process involving the several steps and the relation and order of one or more of such steps with respect to each of the others which are exemplified in the following detailed disclosure, and the scope of the application of which will be indicated in the claims.

For a fuller understanding of the nature and objects of the invention, reference should be had to the following detailed description taken in connection with the accompanying drawing wherein.

Figure 1:
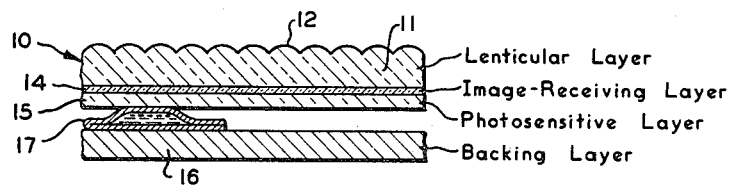
Figure 1 is a schematic, sectional view of a photographic product and illustrates the invention in connection with a photosensitive film assembly having a lenticulated support.

In the preferred embodiments of this invention, photographs are formed by transfer-reversal techniques carried out in conjunction with a silver halide photosensitive layer and a screen having an array of minute optical elements in the nature of a color mosaic as provided in an additive color type of screen or of optical lenses of predetermined surface curvatures as provided in a lenticular type of screen. While, as will hereinafter be pointed out, practice of the invention may be performed by the utilization of photosensitive materials other than silver halide, by the formation of other than silver images, and by other variations involving processing procedures and materials, the reversal processing of silver halide has been made the subject of illustration since it emphasizes the broad concepts of this invention.

As is now well understood to the art, a photographic transfer process may be utilized to form in an image- or print-receiving layer a reverse image of a latent image contained in a photosensitive layer. In carrying out a silver halide photographic transfer process, a liquid composition comprising a silver halide developer and a silver halide fixer or solvent, i.e. a transfer agent, may be substantially uniformly permeated into an exposed silver halide photosensitive layer. The liquid develops the latent image in the silver halide emulsion and forms a soluble silver complex, e.g., a thiosulphate or a thiocyanate with undeveloped silver halide, which is transferred in solution to an image- or print-receiving layer in superposed relation to the photosensitive layer where this complex is developed to silver to provide the desired reverse image.

The present invention, as indicated, relates to a photographic transfer process and utilizes an improved film structure employing a transparent support which carries a photosensitive layer and an image-receiving layer on one side thereof. Additionally, the invention illustrates a film structure which associates a backing layer with the film assembly. This backing layer provides an outermost layer of the product and permits both the photosensitive layer and the image-receiving layer to be located on one side of a rupturable container for a liquid processing composition. In other words, the container may be located between the backing layer and that layer of the product which is directly adjacent the backing layer.

A film assembly of this character possesses a number of advantages. For example, it embodies all of the layers needed to carry out a transfer process in a composite structure of such nature that the layers thereof are maintainable in superposed relation at least until formation of the desired reverse image. Such a construction is advantageous from the standpoint that it lends itself to simplified camera design as it does not require separation of the layers for exposure purposes.

In addition, a construction of this type is especially adapted for providing a film assembly useful in color photography as well as in stereoscopic photography. A film assembly which may be used in either of the just-mentioned photographic fields is made possible by utilizing a transparent support which is provided at least on one surface thereof with a gridlike arrangement of a multiplicity of minute optical elements and which supports a photosensitive layer and an image-receiving layer on a surface thereof. In the case of a film useful for color work, these minute optical elements may be provided by lenticules or by a color screen formed of filter elements of conventional character. The lenticular arrangement is, of course, also especially suited for carrying out stereoscopic photography.

In a composite type of film structure of the character indicated, the image-carrying layer may be made so thin, i.e., about .00001 inch or of the order of a wavelength of light, that effectively a structure is always provided which is substantially the equivalent of placing the lenticular layer or the screen layer and the photosensitive layer next to each other. Such practice is advantageous since, in the case of a screen or lenticular process, parallax is kept to a minimum during taking or exposure and for viewing purposes is reduced over all other available systems. Furthermore, the composite structure, in so far as a transfer process is concerned, permits a construction wherein sidewise diffusion of the liquid undergoing transfer from one layer to another may be substantially eliminated. Another advantage attributable to a composite film structure for carrying out a transfer process resides in the fact that perfect registration of the screen or the lenticules with the photosensitive and image-carrying layers, i.e., perfect registration for taking and viewing purposes, is assured.

In color work with lenticular type of film, appropriate filters are employed for taking and projection purposes. For example, the lenticular film is exposed through a conventional filter which has two or more sections of different color and which is located on the object side of a camera lens, while for viewing purposes the lenticular film is projected through a similar filter adapted to be located on the projection screen side of a projection lens.

By one practice, a stereoscopic pair of images of an object being photographed may be optically formed on the photosensitive layer of a lenticular film, mounted in a suitable camera, with the aid of a conventional binocular-type viewing device which makes use of prism and/or mirror means and which is mounted in optical alignment with the camera objective on the object side of said objective. A device of this nature is commonly known as a "stereo-attachment."

A similar binocular device may be utilized for projecting onto a suitable screen developed stereoscopic image pairs formed in lenticular film. In this instance, the binocular device is located on the image side of the objective through which the developed film is projected and said binocular device is equipped with suitably different light-polarizing filters, for example, opposite plane polarizers, whereby the screen images will be formed with differently polarized light. This arrangement permits an observer who is wearing glasses or spectacles, having two suitably different light-polarizing lenses which are appropriately oriented, to view the left-eye image of a projected stereoscopic pair only with his left eye and to view the right-eye image of said projected image pair only with his right eye.

Other advantages are derived from a composite structure such as that described. In this connection, the use of a backing layer permits the container for the processing liquid to be located at a position where the contents thereof can only reach the photosensitive layer or the image-receiving layer after the liquid has permeated or penetrated through one or the other of these layers. In certain instances, such practice is desirable.

For example, in a transfer process of the type which involves the formation of a dye image in the image-receiving layer by a dye coupling reaction, it is generally desirable to arrange the image-receiving layer with respect to the photosensitive layer so that liquid processing composition must first pass through the photosensitive layer before it can contact the image-receiving layer. Such practice is advantageous for avoiding dye stain in the highlights of the transfer image in circumstances wherein a secondary color developer and a coupler in solution in liquid processing composition imbibed into a silver halide layer are utilized to develop latent image to silver and form a dye image in situ therewith, and wherein developer and coupler in excess of that required for said silver and dye development are transported in solution to an image-receiving layer where the unreacted developer is oxidized for coupling with the transported unreacted coupler to provide the desired dye image.

The present invention permits arrangement of the layers of the film assembly which facilitates carrying out practice of the nature just described in that it allows the photosensitive layer to be positioned next to the image-receiving layer, which is located next to the transparent support of the film assembly, whereby the container for the liquid processing composition may be positioned between the backing layer and the photosensitive layer.

One embodiment of a film assembly 10, suitable for carrying out the invention, is illustrated in Fig. 1 and comprises a transparent support 11 provided on one surface thereof with a multiplicity of lenticules 12 and provided on the other surface thereof with an image-receiving layer 14 and a photosensitive layer 15, the image-receiving layer being located next to the support 11. Additionally, the film assembly 10 includes a backing layer 16 which provides an outermost layer of the assembly and has a rupturable container 17 positioned between the backing layer 16 and the photosensitive layer 15. Container 17 is adapted to contain a suitable processing liquid, preferably of a viscous nature. Exposure of the film assembly 10 is through the support 11, the lenticules 12 thereof acting to suitably direct the light onto various portions of the photosensitive layer 15. In order to carry this out, the image-receiving layer 14 is, of course, of a transparent material. In the embodiment of the invention disclosed in Fig. 1, the backing layer 16 may be opaque.

The liquid within the container 17 includes an organic film-forming agent, such for example as carboxymethyl cellulose. This processing liquid is also a solvent for a silver halide developer and a silver halide fixer, both of which may be included in the liquid. Alternatively, the silver halide developer and/or fixer may be incorporated in some layer of the film assembly into which the processing reagent is penetrated.

The film assembly 10 may be in the form of cut film or in the form of roll film. In either instance, the backing layer 16 may be sealed along its longitudinal edges to the photosensitive layer 15 whereby a composite one-piece structure is provided. When used as roll film, two or more containers 17 will be mounted at spaced intervals on the backing layer. These intervals will be such that an individual container will be located adjacent one end of each picture frame of the film assembly.

In use, following exposure, the film assembly 10 is processed in the absence of actinic light by moving the film through a pair of pressure-applying rollers. These rollers rupture the container and spread its liquid content between the backing layer 16 and the photosensitive layer 15 to initiate the processing of the assembly. This processing is carried out in the absence of actinic light for a period of about one minute, after which the lenticular layer or transparent support 11, together with the image-receiving layer 14, is separated, as by stripping, from the photosensitive layer 15 and the backing layer 16. In this embodiment of the invention, the organic film-forming constituent of the processing composition is adapted to bond the photosensitive layer 15 to the backing layer 16 by a bond which is stronger than the bond between the photosensitive layer and the image-receiving layer.

In some instances, it may be desirable to provide a stripping layer between the image-receiving layer 14 and the photosensitive layer 15. Such a layer is indicated by the reference character 18 in Fig. 2, which discloses a film assembly 20 substantially similar in all other respects to the film assembly 10. The use of this stripping layer facilitates separation of the film unit in the manner desired, i.e., with the image-receiving layer adhered to the transparent support 11, since the stripping layer is selected to develop a greater bonding affinity for the photosensitive layer than for the image-receiving layer.

Figure 2:
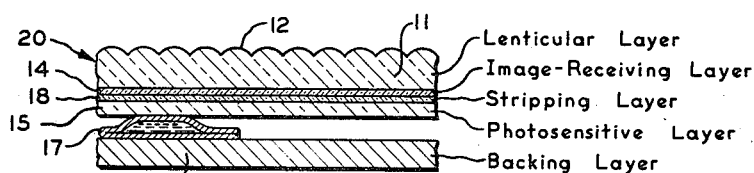
Fig. 2 is a schematic, sectional view of another embodiment of the photographic product of Fig. 1.

It is to be noted that in the structures shown in Figs. 1 and 2, the image-receiving layer is coated directly onto the transparent support and the photosensitive layer is coated on the outer surface of the image-receiving layer. The reverse of this practice is disclosed in Fig. 3 wherein a film assembly 30 is disclosed as having a transparent support 31 provided with lenticules 32 on one side thereof and carrying a photosensitive layer 35 and an image-receiving layer 34 on the other side thereof. A container 37 is shown as disposed between the outermost surface of the layer 34 and a backing layer 36.

In the film assembly 30, all of the layers thereof may be retained together after processing, provided the backing layer is of a transparent character, or the backing layer and the container may be separated from the combined structure 31, 35, 34. Separation of the backing layer and the container 37 is of course necessary in instances where the backing layer 36 is opaque.

It has been discovered in carrying out a silver halide photographic transfer process that the density of the positive image produced is usually greater than the density of the negative. An intensification in the density of the positive image of from 5 to 6 times greater than that possessed by the silver image developed in the photosensitive layer, may be obtained by the employment of suitable controls and procedures, as will presently appear. It is due to this intensification or the high covering power of the silver of the reversal image that it is possible to allow the negative and the positive images to remain in contact with each other. Of course, under these circumstances, the highlights of the positive will be grayed to some extent but this is generally unobjectionable, particularly for projection purposes, due to the considerable difference in density between the positive and negative images.

Figure 4:
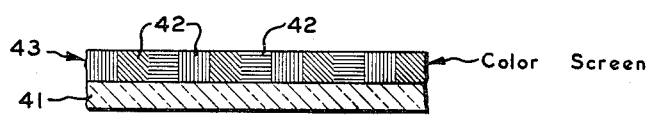
Fig. 4 is a schematic, sectional view of a transparent support with a color screen associated therewith and which is usable with any of the embodiments of Figs. 1, 2 and 3 in place of the lenticulated support.

As indicated, the invention is not limited to the use of lenticules in providing a gridlike arrangement of a multiplicity of minute optical elements. In place of the lenticulated transparent support layers 11 or 31, a transparent support 41, having differently colored elements providing a color screen 43 on one surface thereof, may be employed. This arrangement is detailed in Fig. 4. The screen structure 43 is usable with any of the film assemblies heretofore detailed in lieu of the previously described lenticular supports. The color screen may comprise a single sheet of a suitable transparent material which has been dyed or stained to provide the color filters or screen elements 42 therethrough or it may, as shown in Fig. 4, comprise an undyed base 41 on one side of which color filters are carried. The color screen of the character indicated at 43 is of conventional design and is adapted to be constructed by well known methods. For example, numerous filter screens of the type useful for carrying out the present invention and various methods whereby said screens may be formed are described in detail in the "History of Color Photography," by Joseph S. Friedman, published in 1944 by the American Photographic Publishing Company, in chapters 12 and 13 thereof.

The transparent supports 11 and 31 are preferably formed of a conventional film base material such as a cellulosic ester or mixed ester, for example cellulose nitrate, cellulose acetate, cellulose acetate propionate or other materials which will form a continuous film for use in supporting a photosensitive element. The supports 11 and 31 are formed by conventional practices whereby to provide the lenticules thereon.

Organic plastic materials of the character mentioned in connection with the supports 11 and 31 may also be employed for the backing layer of the film assembly where, as in the assembly 30, the backing layer may be of a transparent character. Any suitable paper, for example kraft paper or baryta paper, may be employed for the backing layer of the film assembly in instances where said backing layer is opaque, such as in the film assembly 10.

The organic plastic materials of the character just mentioned are useful in forming the base layer 41 of the specific screen structure or screen support 43 of Fig. 4. The particular screen structure 43 of Fig. 4 is intended to illustrate a color screen formed by conventional methods such as those described in the previously referred to work of Joseph S. Friedman in his "History of Color Photography." For example, the screen structure 43 may have the filter elements 42 thereof formed of light-transmitting, colored, granular particles which are spread over and adhered to the surface of the transparent base 41 in a single layer, one particle thick, and with the particles in contact with each other in the manner exemplified by the so-called Autochrome plate of Lumiere. Alternatively, for example, the differently colored screen elements 42 of the screen structure 43 may be provided by appropriate dyeing and use of resists to provide a screen similar to that employed in the so-called Dufay process.

The image-receiving layer, such as the layer 14 or the layer 34, is adapted to be coated onto the surface on which it is supported. This coating, when dry, provides a matrix which supports a silver precipitating agent included in the coating. Thus, the layer 14 is applied to the support 11 by being coated thereon while the image-receiving layer 34 is coated onto the photosensitive layer 35.

It has been proposed to use, in the formation of the silver prints by transfer processing, certain compounds and elements whose presence during the process has a desirable effect on the amount and character of the silver precipitated during image formation. For this purpose, such materials as, for example, the metallic sulfides and selenides, the thiooxalates, the thioacetamides and heavy metals such as silver, gold, platinum, palladium and mercury, as well as other materials are disclosed in my U.S. Patents Nos. 2,698,237 and 2,698,245, both issued December 28, 1954.

It has also been disclosed in the just-mentioned patents that the precipitation and aggregation of silver obtained by using the silver precipitating agents, including the above-mentioned materials, are very greatly improved by providing as a vehicle for said agents a macroscopically continuous matrix consisting essentially of submacroscopic agglomerates of particles of a water-insoluble, inorganic, chemically inert, adsorbent substance. The word "submacroscopic" refers to a class of sizes which includes as a subclass those sizes known as submicroscopic. The substance preferably has a low coefficient of absorption for light as compared to silver and the matrix formed therefrom is essentially free of protective colloid action for silver. One example of such a matrix is a layer of silica such as is formed by drying a layer of an aqueous dispersion of the silica aerogel available under the trade name "Santocel C."

One example of a suitable coating composition for providing the image-receiving layer is as follows:

| | |
|---|---|
| 1% solution of sodium sulfide _____cc__ | 280 |
| Silica Aerogel _____grams__ | 30 |
| Solution containing 30 g. cadmium acetate, 1 g. neutral lead acetate and 30 g. zinc nitrate dissolved in 100 cc. of water _____cc__ | 92 |

While coated layers of this nature are shown in the just-noted patents as being applied to a paper or sheet or base, such as baryta paper, it is to be noted that they may be applied with equal facility to the transparent supports of the film assembly shown herein or to a photosensitive layer. In the present invention these matrix-forming coatings are employed as the image-receiving layer for the reception of the transfer image. The transfer image provided in an image-receiving layer formed in accordance with the teachings of said patents ranges from dark brown to black and has good gray middle tones.

The photosensitive layer for any of the embodiments of the invention disclosed in the drawing may employ an emulsion like that of any of the commercially available photosensitive silver halide films. The products of the present invention are particularly useful in improving the results obtained when the transfer process is carried out with one of the high-speed photosensitive silver halid emulsions such as the emulsion of the relatively high-speed orthochromatic films, e.g., Eastman Kodak Verichrome film, having an ASA speed rating of 0200 and an ASA exposure index rating in the daylight of 50, and the extremely high-speed panchromatic emulsions, e.g., Eastman Kodak Super XX Pan having an ASA speed rating of 0400 and an ASA exposure index rating in the daylight of 100, and Ansco Triple S Pan. The emulsion which provides the photosensitive layer is also coated on the surface which supports it, such for example as the image-receiving layer 14 or the transparent lenticular support 31.

One suitable example of a processing reagent is as follows:

| | Grams |
|---|---|
| Water | 1860 |
| Sodium carboxymethyl cellulose | 117 |
| Sodium sulfite | 78 |
| Sodium hydroxide | 74.6 |
| Sodium thiosulfate | 14.5 |
| Citric acid | 38.5 |
| Hydroquinone | 52 |

The processing agent is prepared by dissolving the sodium carboxymethyl cellulose, for example the commercially available Hercules #1362 medium viscosity type, in the water in a mixer at room temperature, and the solution is mixed therein for approximately one hour. Thereafter, the sodium sulfite, sodium hydroxide, sodium thiosulfate and citric acid are added to the solution, the addition being effected in an inert atmosphere, for example of nitrogen. Upon dissolution of these materials, the hydroquinone is added and the solution is further mixed for an hour at approximately room temperature in a nonoxidizing atmosphere of nitrogen.

Other developing agents may be employed in place of the hydroquinone noted in the just foregoing example. For example, one of the following photographic developers may be employed: p-aminophenol hydrochloride; bromohydroquinone; chlorohydroquinone; diaminophenol hydrochloride; toluhydroquinone; monomethyl-p-aminophenol sulfate; a mixture consisting by weight of one-half hydroquinone and one-half p-hydroxyphenylaminoacetic acid; and a mixture consisting by weight of one-fourth hydroquinone and three-fourths p-hydroxyphenylaminoacetic acid.

The containers 17 and 37 are preferably inexpensive and disposable and so constructed as to be capable of retaining the liquid processing agent or composition therein for relatively long periods of time without vapor loss or oxidation. One example of a suitable container of this type is formed from a single multilayer sheet of material comprising three laminae. The inner lamina, which provides the inner surface of the container, is formed of a material which is chemically inert to the reagents in the processing agent and which is impervious to the liquid of the agent. One class of materials suitable for this purpose, particularly where the processing agent is an alkaline solution, is the polyvinyl acetals, and of the acetals, polyvinyl butyral is a preferred species. A composition comprising 60% to 72% by weight of polyvinyl butyral, 10% to 23% by weight of nitrocellulose, and approximately 5% by weight of dibutyl sebacate is satisfactory as the inner lamina. The intermediate lamina is preferably impervious to the vapor of the processing agent and is formed, for example, of a metallic foil such as lead or silver foil. The outer or backing lamina is formed of a strong, deformable, relatively inexpensive sheet material such as a kraft paper.

A container may be made from a single sheet of the just-described three-ply material by folding the same along its longitudinal axis and thereafter securing the end marginal portions and the overlying marginal portions of the two folded faces of the sheet one to the other whereby to provide a space or cavity for containing the processing liquid. The marginal portions of the overlying container walls along the long edges thereof which are removed from the fold are preferably sealed together by a bond which is weaker than the bond securing the end portions thereof. This may be effected by the control of heat and/or pressure employed for sealing said long edges of the container in conjunction with an overcoat of ethyl cellulose or ethyl cellulose and paraffin provided as a strip on the inner surface of one of the overlying container walls along said long edge thereof. As a result, the application of pressure to the opposite sides of the container will effect the rupture of this weaker bond along said long edges to permit discharge of the liquid from the container. To fill the container, it is possible to adhere together said long edges thereof and one of the end marginal portions and to then fill the container through the other end, after which the last-mentioned end is sealed.

The stripping layer 18, shown in Fig. 2, comprises a coating of plastic material which is applied to the image-receiving layer and over which the photosensitive layer is coated. Suitable film-forming materials for forming a thin coating of this nature comprise, for example, gum arabic, cellulose acetate hydrogen phthalate, polyvinyl alcohol, hydroxyethyl cellulose, methyl cellulose, sodium alginate, and polymethacrylic acid. This stripping layer is adapted to minimize the adhesion between the photosensitive layer and the image-receiving layer whereby to assure the stripping of the photosensitive layer from the image-receiving layer after processing of the film assembly. As one specific example, the support 11, provided with image-carrying layer 14, has roll-coated on the outer surface of the image-receiving layer against a smooth surface such, for example, as the polished surface of a metal drum, a 5% aqueous solution of polyvinyl alcohol in a layer whose thickness is of the order of .001 inch. An equivalent amount by weight of hydroxyethyl cellulose or polymethacrylic acid may be substituted for the polyvinyl alcohol of this example. Other examples of stripping layers suitable for this purpose are disclosed in the previously mentioned United States Patent No. 2,698,237.

In instances where a stripping layer is employed, as in the film assembly 20, it may be desirable to secure the image-receiving layer 14, stripping layer 18 and photosensitive layer 15 in superposed relation by weaker bonding means than those described. The bond strength may be decreased by the use of water-soluble compounds of low molecular weight, such as sugar or appropriate salts, which are incorporated in the stripping layer as in either or both surfaces thereof or substantially uniformly throughout the layer.

On the other hand, when the photosensitive layer is to be separated from the film assembly, it may be desirable to cause the backing layer to become adhered to the photosensitive layer by a bond which is stronger than that ordinarily provided between these two layers by the organic film-forming material contained in the liquid processing composition which is spread between the photosensitive and backing layers. This may be accomplished by incorporating, at least in the surface of the photosensitive layer and/or backing layer, a substance which is capable of cross-linking the film-forming material of the liquid processing composition. Lead salts are well known for this purpose and neutral lead acetate may be named as a preferred cross-linking substance.

It will be realized that in some instances it may be desirable to simultaneously employ both of the just-described practices for varying the bond strength between the superposed layers, and such use is deemed to fall within the scope of this invention.

From the foregoing, it is believed that the use and operation of the film assemblies will be thoroughly apparent. Each of the film assemblies 10, 20 and 30, whether equipped with a transparent support having lenticules thereon or a support providing a color screen, will be exposed through the support. Processing of the exposed film assembly may, as previously noted, be carried out in the absence of actinic light by moving the film through pressure-applying rolls which rupture the container of the film assembly and spread its liquid content between the backing layer of the assembly and that layer which is next to the backing layer. Imbibition of the spread liquid processing composition is also carried out in the absence of actinic light for a period of about a minute. The film assemblies 10 and 20, regardless of whether the transparent support through which exposure was made is a lenticular layer or a color screen, are separated so that the image-receiving layer and the transparent support remain adhered together. In the case of the film assembly 30, no separation is required for the reasons heretofore set forth.

While embodiments of the invention making use of a lenticular support have been illustrated with the lenticules thereof forming an outer surface of a film assembly, it is possible to employ a construction and arrangement wherein the lenticular side of the transparent support is located inwardly of the outer surface of the film assembly. As will be understood, where this practice is followed, there should preferably be one layer between the transparent lenticular support and the photosensitive layer which has either a higher or a lower index of refraction than the material of the support. The index of refraction of this last-mentioned layer will determine whether the lenticules are of concave or convex shape when viewed from the exposure side of the film assembly.

When the lenticular surface is positioned inwardly in the film assembly 10 or 20, the image-receiving layer itself may serve to carry out the just-mentioned arrangement provided there is a sufficient difference in refractive indices between the lenticular transparent support and the image-carrying layer. On the other hand, if the needed difference in refractive indices is lacking, an extra layer of suitable transparent material may be located between the image-receiving layer and the photosensitive layer in the film assemblies illustrated in Figs. 1 and 2. A similar practice may be carried out with the film assembly 30 by locating between the lenticular transparent support 31 and the photosensitive layer 35 a transparent layer having an index of refraction different from that of the transparent lenticular support.

As heretofore pointed out, practice of the invention is subject to a number of variations involving both processing procedures and materials.

While application of a processing liquid onto the outer face of a layer 15 or 34 is preferably carried out by practice which, in conjunction with a backing layer 16 or 36 makes use of a rupturable container 17 or 37 adapted to hold the processing liquid, it is to be noted that the processing liquid may be otherwise applied. For example, the processing liquid may be applied to a layer 15 or 34 by means of a suitable roll coater mechanism over which the layer is moved following the exposure of the photosensitive layer 15 or 35 with which it is associated.

A generally preferred processing liquid, as heretofore pointed out, comprises an alkaline solution of a silver halide developer and a silver halide tranfer agent which is thickened by the addition thereto of an organic film-forming material. A typical alkaline processing liquid possesses a pH of at least 8 or 9 and is thickened by means of a suitable material or agent to a viscosity ranging from 100 to 200,000 centipoises at 20° C. While as heretofore indicated a film-forming agent such as sodium carboxymethyl cellulose is representative of a preferred material capable of increasing the viscosity of the liquid, it is to be noted that other agents or materials are available for this purpose. In this regard, the processing liquid may be thickened by the addition thereto of an agent such as any water-soluble polymer, for example, a plastic material such as the previously mentioned sodium carboxymethyl cellulose, starch or gum, or the processing liquid may be thickened by an agent such as a water-insoluble emulsifiable oil present in the liquid as the internal phase of a water-oil emulsion.

A film-forming material such as sodium carboxymethyl cellulose is effective for providing a processing liquid capable of being uniformly spread or applied onto a surface of a layer of a permeable material to quickly provide upon said surface, as a result of the absorption of moisture into said layer as well as the evaporation of moisture, a transparent solid film which is permeable to alkaline liquid. This film which is adhered to the surface of said layer may be permanently retained in attachment thereto and may be employed as an image-receptive material or image-receiving layer. The ability of the solid film or layer which is provided by the processing liquid to act as image-receptive material is enhanced if silver precipitating agents of the character previously mentioned are incorporated in the processing liquid before it is applied. Practice of this nature is disclosed in U.S. Patent No. 2,662,822, issued December 15, 1953, wherein the processing liquid is in part utilized to provide the image-receiving layer.

Figure 3:
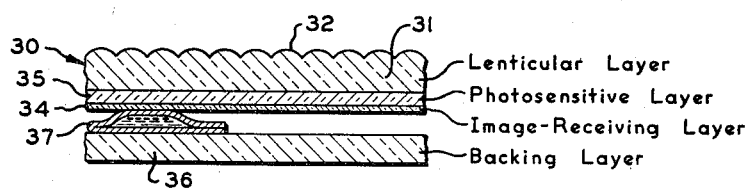
Fig. 3 is a schematic, sectional view of a further embodiment.

Practice wherein the processing liquid contains silver precipitating agents is particularly suited for use in conjunction with the film assembly 30 of Fig. 3 inasmuch as it obviates the need of a special image-receiving layer 34 and permits a reverse image of the latent image formed by the photoexposure of the photosensitive layer 35 to be provided in an image-receiving layer formed by the processing liquid. In this concept of the invention the backing layer 36, if transparent, may remain adhered to the image-receiving layer formed by the processing liquid or it may be stripped away by the utilization of means at the surface of the backing layer which cause it to be adhered to the processing liquid by a bond which is weaker than that between the processing liquid and the photosensitive layer 35.

Generally speaking, an image-receptive layer provided by the processing liquid is retained, together with the screen member, as a unit for viewing and for projection purposes. It should be recognized, however, that it is possible to form the positive or transfer image at least in part in the processing liquid and at least in part in some element of the film assembly such as a layer carried by the screen or even the screen itself in instances where this element or a surface stratum thereof is permeable to the processing liquid. Under these just-described conditions, there are in effect two transfer images, one of which is contained in the layer of processing liquid and the other of which is contained in the permeable element of the film assembly. It therefore becomes possible to remove the layer formed by the processing liquid and containing one of these images while leaving the relationship of the other transfer image to the screen undisturbed and retaining it and the screen together as a unit.

In the foregoing disclosure silver halide is set forth as a preferred photosensitive material. Other photosensitive materials, such for example as a heavy metal salt capable of forming a latent image upon photoexposure and capable of development to provide a visible image comprising the metal of said salt, are available for the formation of a color print where these materials display a suitable color sensitivity. Such photosensitive materials as those just named are also available for the formation of a stereoscopic print. U.S. Patent No. 2,543,181, issued February 27, 1951, discloses the use, in a transfer process, of the just-entioned photosensitive heavy metal salts in addition to the use of silver halide.

Also, it is pointed out that this invention may be practiced to provide visible images in terms of a dye which is black or a mixture of dyes which together give a black image.

For example, a black dye image may be provided by the use of a conventional photographic coupler or mixture thereof and a color developer having an oxidation product reactable with the coupler or coupler mixture or by the use of a primary or self-coupling developer or mixture of such developers as taught in U.S. Patent No. 2,559,643, issued July 10 1951, U.S. Patent No. 2,661,293, issued December 1, 1953 and U.S. Patent No. 2,698,244, issued December 28, 1954.

Another mechanism for providing black dye images employs in the negative or photosensitive portion of a film assembly a complete dye having a coupling function, immobilizes the dye in said negative portion as a function of silver halide development and transfers unreacted dye to image-receptive material where the dye may be employed without reaction to provide the desired image or may undergo reaction, all as taught in the copending application of Howard G. Rogers, Serial No. 358,012, filed May 28, 1953, now Patent No. 2,774,668, granted December 18, 1956.

Another mechanism for providing a black dye image is set forth in the application of Howard G. Rogers, Serial No. 415,073, filed March 9, 1954, now abandoned and replaced by application Serial No. 748,421, filed July 14, 1958, wherein there is employed as a dye material a complete dye which is also a silver halide developer.

Furthermore, as discussed in the just-mentioned application Serial No. 748,421, the utilization of the ability of a tanning developer to harden a carrier material of a layer which contains a black dye or dye mixture which is black may be employed to control the differential transfer of the dye or dye mixture for the purpose of forming a transfer print.

These and other practices for the formation of black dye images are considered as falling within the scope of this invention.

While the formation of images which are black and which comprise silver or a dye or a dye mixture may be named as a preferred practice, it will be understood that the invention may be carried out to provide color points by the formation of images having a visible appearance other than neutral, for example, brown or sepia.

Since certain changes may be made in the above process without departing from the scope of the invention herein involved, it is intended that all matter contained in the above description or shown in the accompanying drawing shall be interpreted as illustrative and not in a limiting sense.

What is claimed is:

1. In a process for forming photographs utilizing a multilayer structure comprising a screen having an array of minute optical elements, a photosensitive layer, including a photosensitive material capable of having a developable image formed therein by exposure, superposed with and carried by said screen, and an image-receiving layer superposed with and carried by said screen at a location on the same side of said screen as said photosensitive layer, the steps comprising photoexposing said photosensitive layer with light directed through said screen and forming in said photosensitive layer a plurality of latent images the distribution of which is determined by the arrangement of said minute optical elements; permeating a processing liquid inwardly into said photosensitive layer only through the outer surface of said multilayer structure furthest from said screen; by means of said processing liquid developing said latent images in said photosensitive layer, forming an imagewise distribution of transferable image-forming substances and transferring said image-forming substances to said image-receiving layer to form visible images of said latent images in said image-receiving layer; retaining said photosensitive layer in fixed relation to said screen during exposure and formation of said visible images; and retaining said image-receiving layer in permanent fixed relation to said screen during and after formation of said visible images.

2. The process of forming photographs as defined in claim 1 wherein said photosensitive materials is silver halide.

3. The process of forming photographs as defined in claim 1 wherein said multilayer structure comprises a film assemblage including a liquid-confining layer, and wherein said liquid-confining layer is superposed with an outer surface of said assemblage and said processing liquid is distributed in a layer between said liquid-confining layer and said outer surface for permeation into said photosensitive layer.

4. The process of forming photographs utilizing a multilayer structure comprising a transparent screen and a photosensitive layer and a layer of image-receptive material, both of said layers being superposed with and carried by said screen in retainable relation thereto on one surface of said screen, said process comprising the steps, performed while retaining said photosensitive layer in fixed relation to said screen, of predeterminedly directing light through said screen to said photosensitive layer, said screen being characterized by having an array of minute optical elements adjacent at least one surface thereof whereby light transmitted through said screen is directed into said photosensitive layer over a multiplicity of minute areas the distribution of which is determined by the arrangement of said minute optical elements, to provide a latent image in each of said areas on which light is directed; said photosensitive layer having as a photosensitive material thereof a heavy metal salt capable of forming a latent image upon exposure and capable of development to produce a visible image comprising the metal of said salt, permeating a processing fluid inwardly into said photosensitive layer only through the outer surface of said multilayer structure furthest from said screen, said processing fluid containing, after permeation of said photosensitive layer, all of the reagents including a developing agent for developing said latent images in said photosensitive layer to form a visible record of the subject matter of each of said latent images; developing said latent images by said processing fluid and forming, as a result of said development, an imagewise distribution of image-forming substances; transferring said image-forming substances to said layer of image-receptive material; and retaining said layer of image-receptive material in superposed fixed relation to said screen and said photosensitive layer during and after formation of said visible record.

5. The process of forming photographs defined in claim 4 wherein said heavy metal salt is silver halide.

6. The process for forming photographs as defined in claim 4 including the step of separating said screen and said layer of image-receptive material as a unit from said photosensitive layer.

7. The process of forming photographs as defined in claim 4 wherein said layer of image-receptive material in which said visible records are provided is in contact with said surface of said screen through which light is directed to expose said photosensitive layer, and said photosensitive layer is located adjacent said layer of image-receptive material on the side of said layer of image-receptive material furthest removed from said screen.

8. The process of forming photographs as defined in claim 4 wherein said photosensitive layer is in contact with said surface of said screen through which light is directed to expose said photosensitive layer, and said layer of image-receptive material is in contact with said photosensitive layer.

9. The process for forming photographs as defined in claim 4 wherein said heavy metal salt is silver halide and said developer is a silver halide developer.

10. The process for forming photographs as defined in claim 4 wherein said heavy metal salt is silver halide and said reagents comprise a silver halide developer and a silver halide transfer agent capable of forming with unexposed silver halide a differential disposition of silver complex for transfer to said image-receiving layer.

11. The process of forming positive images in silver utilizing a multilayer structure comprising a transparent screen one side of which includes an array of minute optical elements, a photosensitive layer comprising a photosensitive silver salt carried in superposed fixed relation on the light-emission side of said screen and an image-receptive layer carried in superposed relation with said photosensitive layer on said side of said screen, said process comprising the steps performed, while retaining said photosensitive layer in fixed relation to said screen, of directing light through said screen to said photosensitive layer for differentially exposing said photosensitive silver salt to form in said photosensitive layer a plurality of developable latent images consisting of separate minute areas, the distribution of which is determined by the arrangement of said minute optical elements; permeating inwardly into said photosensitive layer only through the outer surface of said multilayer structure furthest from said screen, a processing fluid comprising a silver salt developer and a silver salt solvent; reacting said silver salt developer with exposed silver salt for developing said latent images; reacting said silver salt solvent with at least a part of the undeveloped silver salt of said photosensitive layer to form in said layer a differential distribution of a diffusible silver complex; forming a visible record of each of said latent images by reducing to silver the silver ions of said complex in the presence of a silver precipitating agent contained in said image-receptive layer; and retaining said image-receptive layer containing said visible records in superposed fixed relation to said screen and said photosensitive layer during and after formation of said visible records.

12. The process of forming positive images in silver as defined in claim 11 including the steps of carrying out the development of said latent images in said photosensitive layer by applying to the photosensitive layer a layer of a processing liquid comprising a solution of a viscous film-forming reagent which has a silver precipitating agent dispersed therein and which is capable of providing a transparent stratum of an image-receptive material attached to said photosensitive layer for receiving by transfer at least a part of said silver complex to provide said visible records of said latent images.

13. The process of forming positive images in silver as defined in claim 11 wherein said visible records are provided by diffusing said silver complex from said photosensitive layer to a layer of an image-receptive material carried by said screen and containing a silver precipitating agent.

14. The process of forming positive images in silver as defined in claim 11 wherein the photosensitive material of said photosensitive layer comprises silver halide and wherein latent images therein are developed by a silver halide developer.

15. The process of forming positive images in silver as defined in claim 11 wherein the photosensitive material of said photosensitive layer is silver halide and including the steps of developing said latent images by means of a silver halide developer soluble in a processing liquid which is permeated into said photosensitive layer and of transferring said silver complex by means of a silver halide solvent, also soluble in said processing liquid.

References Cited in the file of this patent

UNITED STATES PATENTS

| 2,158,174 | Capstaff | May 16, 1939 |
| 2,208,754 | Eggert et al. | July 23, 1940 |
| 2,563,342 | Land | Aug. 7, 1951 |
| 2,614,926 | Land | Oct. 21, 1952 |
| 2,665,986 | Rott | Jan. 12, 1954 |
| 2,673,800 | Meeussen et al. | Mar. 30, 1954 |

FOREIGN PATENTS

| 59,365 | Holland | May 16, 1947 |